(12) United States Patent
Dwekat et al.

(10) Patent No.: US 7,336,639 B1
(45) Date of Patent: Feb. 26, 2008

(54) METHOD AND SYSTEM FOR PROVIDING SERVICE REQUEST NOTIFICATIONS RELATED TO A COMMUNICATIONS NETWORK

(75) Inventors: Zyad Ahmad Dwekat, Raleigh, NC (US); Jeffrey M. Fries, Wake Forest, NC (US); Farooq Ijaz Cheema, Raleigh, NC (US); John A. Lowe, Garner, NC (US)

(73) Assignee: Embarq Holdings Company, LLC, Overland Park, KS (US)

( * ) Notice: Subject to any disclaimer, the term of this patent is extended or adjusted under 35 U.S.C. 154(b) by 483 days.

(21) Appl. No.: 11/041,467

(22) Filed: Jan. 24, 2005

(51) Int. Cl.
*H04Q 7/28* (2006.01)

(52) U.S. Cl. .................... 370/340; 379/111; 379/88.11; 379/88.09; 370/352; 370/389; 370/392

(58) Field of Classification Search .................. 705/45, 705/35; 370/352, 389, 392; 379/88.11, 379/88.09, 114.15, 88.22, 11, 111; 709/236, 709/219; 717/126
See application file for complete search history.

(56) References Cited
U.S. PATENT DOCUMENTS 5,870,725 A * 2/1999 Bellinger et al. .............. 705/45
6,249,570 B1 * 6/2001 Glowny et al. .......... 379/88.22
6,731,625 B1 * 5/2004 Eastep et al. ................ 370/352
6,785,370 B2 * 8/2004 Glowny et al. .......... 379/88.22
6,909,708 B1 * 6/2005 Krishnaswamy et al. ... 370/352

* cited by examiner

*Primary Examiner*—Rafael Perez-Gutierrez
*Assistant Examiner*—Joseph Arevalo
(74) *Attorney, Agent, or Firm*—Patton Boggs LLP (57) ABSTRACT

A trunk-group request tool automates the process of manually receiving and analyzing trunk-group circuits pertaining to switch circuits located within a switch facility of a communications network. An embodiment of the computer-implemented method includes receiving a switch or vendor identifier from a data structure, presenting records of information of one or more trunk groups associated with the identifier(s), receiving one or more trunk-group attributes from one or more entry fields, populating a data structure by aggregating one or more records of information of a data structure of the switch and vendor identifier with one or more trunk-group attributes, providing an input field for receiving additional data to supplement one or more records of information or one or more trunk-group attributes, and presenting a report adhering to a predefined format using the information of the data structure.

22 Claims, 8 Drawing Sheets

Trunk-Group Service Request - External

ADMINISTRATIVE SECTION
TGSR Number - ALN00001
Requested Response - 11/15/2004
Requested Due Date - 11/30/2004
Date Sent - Account Mgmt Fills Out
Interexchange Customer Service Center (ICSC) - UZ01
Access Customer Terminal Location (ACTL) - DOJHTKYNV
Secondary Location (SECLOC) - DOJTHKVEY

510

Routing (RTG) - T
Traffic Type (TRFTYP) - OT-TT
Feature Group (FG) - D
Reason of Issuance of TGSR - 1
ASR Required? - Y
Project Identification - LMMDOJHTKYNV
Related TGSR Number - N/A
Supplement Version - A
Supplement Type - N/A

TRUNK-GROUP DETAIL SECTION
Study Period Date - N/A
Busy Hour - N/A
Percent Blocking - N/A
ECCKT Present - .PH.-4.TD. - HID.DOJHTKYNV.DOJTHKVEY
TSC Proposed - PM000141
Unit - T
Present Capacity - 96
Required Capacity - N/A
Recommended Capacity - 96
AC Circuit Reference (CKR) - EO3DIRJEI004040020310

CONTACT SECTION
EC/CAC Contact - Network Design - John Smith    Telephone - 888-888-8888
ICSC Contact - Project Associate
Telephone - 800-888-8888    Fax Number - 816-XXX-XXXX
Email - test@sprint.com
Street - 49530 Johnson Street
Room/Mail Stop - EROL22034
City - Kansas City   State - MO       Zip - 64110

REMARKS SECTION
Remarks - JTL will remain the same; however, the switch CLLI code will change. We will require to schedule a PPTD (Project Plant Test Date), and PFPTD (Project Facility PTD) prior to the inservice date of the converted circuits. Furthermore, the Point Code for this office will not change. Carrier markets field service manager will be in contact with you with an actual cut over date.

FACTL - DOJHTKYNV
AP Contact - John Smith
Telephone - 888-888-8888

FIG. 5.

ADMINISTRATIVE SECTION

| (1) TGSRNO | (2) RRD | (3) RRD | (4) FDD | (5) D/T SENT | (6) ICSC | (6) PG OF | (8) ACNA |
|---|---|---|---|---|---|---|---|
| ATX00016 | 11/15/2004 | 11/30/2004 | N/A | Accounts Mgmt Fill Out | UZ01 | 1 of 1 | ATX |
| ATX00016 | 11/15/2004 | 11/30/2004 | N/A | Accounts Mgmt Fill Out | UZ01 | 1 of 1 | ATX |
| ATX00018 | 11/15/2004 | 11/30/2004 | N/A | Accounts Mgmt Fill Out | UZ01 | 1 of 1 | ATX |
| ATX00019 | 11/15/2004 | 11/30/2004 | N/A | Accounts Mgmt Fill Out | UZ01 | 1 of 1 | ATX |
| ATX00020 | 11/15/2004 | 11/30/2004 | N/A | Accounts Mgmt Fill Out | UZ01 | 1 of 1 | ATX |
| ATX00021 | 11/15/2004 | 11/30/2004 | N/A | Accounts Mgmt Fill Out | UZ01 | 1 of 1 | ATX |
| ATX00022 | 11/15/2004 | 11/30/2004 | N/A | Accounts Mgmt Fill Out | UZ01 | 1 of 1 | ATX |

TRUNK-GROUP DETAIL SECTION

| (21) SDTDYPD | (22) BSYHR | (23) % BLOCKING | (24) ECCKT-PRESENT | (25) TSC-PRESENT |
|---|---|---|---|---|
| N/A | N/A | N/A | .DF.-4.TD.VN ATX.DOJHTKYNV.DOJTHKVEY | UT01203 |
| N/A | N/A | N/A | .DF.-4.TD.VN ATX.DOJHTKYNV.DOJTHKVEY | UT01206 |
| N/A | N/A | N/A | .DF.-4.TD.VN ATX.DOJHTKYNV.DOJTHKVEY | UT01204 |
| N/A | N/A | N/A | .DF.-4.TD.VN ATX.DOJHTKYNV.DOJTHKVEY | UT01202 |
| N/A | N/A | N/A | .DF.-4.TD.VN ATX.DOJHTKYNV.DOJTHKVEY | UT01209 |
| N/A | N/A | N/A | .DF.-4.TD.VN ATX.DOJHTKYNV.DOJTHKVEY | UT01201 |
| N/A | N/A | N/A | .DF.-4.TD.VN ATX.DOJHTKYNV.DOJTHKVEY | UT01208 |

CONTACT SECTION

| (33) EC/CAC CONTACT | (34) TEL | (35) ICSC CONTACT | (36) TEL | (37) FAX NO. | (38) EMAIL |
|---|---|---|---|---|---|
| John Smith | 888-888-8888 | Project Associate | 888-888-8888 | 888-888-8888 | test@sprint.com |
| John Smith | 888-888-8888 | Project Associate | 888-888-8888 | 888-888-8888 | test@sprint.com |
| John Smith | 888-888-8888 | Project Associate | 888-888-8888 | 888-888-8888 | test@sprint.com |
| John Smith | 888-888-8888 | Project Associate | 888-888-8888 | 888-888-8888 | test@sprint.com |
| John Smith | 888-888-8888 | Project Associate | 888-888-8888 | 888-888-8888 | test@sprint.com |
| John Smith | 888-888-8888 | Project Associate | 888-888-8888 | 888-888-8888 | test@sprint.com |

610D

REMARKS SECTION

| (45) REMARKS | (46) FACTL | (47) AP CONTACT |
|---|---|---|
| CFA will remain the same, however, the switch CLLI code will change. | EISOFEIRLDS3 | J.DOE |
| CFA will remain the same, however, the switch CLLI code will change. | EISROOWIEO1 | J.DOE |
| CFA will remain the same, however, the switch CLLI code will change. | BJEIDOFLWO1 | J.DOE |
| CFA will remain the same, however, the switch CLLI code will change. | BJEODOFZE5 | J.DOE |
| CFA will remain the same, however, the switch CLLI code will change. | EISOPOXOSI8 | J.DOE |
| CFA will remain the same, however, the switch CLLI code will change. | BJEQOEIODJ2 | J.DOE |
| CFA will remain the same, however, the switch CLLI code will change. | EISUEIOPOS2 | J.DOE |

FIG. 6B.

METHOD AND SYSTEM FOR PROVIDING SERVICE REQUEST NOTIFICATIONS RELATED TO A COMMUNICATIONS NETWORK

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

In a communications network, a provider of a switch or switching facility is responsible for informing both internal and external parties of any trunk group changes, additions, or deletions. Therefore, it is important to inform a party relating to a particular trunk-group of a modification being made to the respective trunk group. It is also important for a provider of a switch or switching facility to formally inform the party being affected to have adequate time and associated information pertaining to the trunk group being changed.

To better understand the present art, a provider making changes to a switch or switching facility is responsible for informing the interconnected party being affected of any changes made to the current trunk-group. As a communication network continues to grow, it may become necessary for a communication carrier to make modifications or changes to a trunk-group within the switch facility. It is therefore the communication carrier's responsibility to inform the interconnected trunk carrier of any changes being made to determine any down time that an interconnected party may experience during the servicing period of time that occurs when modifications are made to the respective trunk-group circuit.

When a formal report relating to one or more interconnected trunk-group circuits is drafted and submitted to an interconnected party, it becomes a time-consuming process to create a report for tens or a hundreds of trunk-groups. A large amount of time is spent looking up and extracting information used to create the report or "Trunk Group Service Request" (TGSR) for each and every trunk group being modified. In some particular instances, a group of 100 or even a 1000 trunk groups requiring modifications within a particular switch would take days or even weeks to complete one or more reports (TGSR) for all external parties or carriers. This requirement to communicate trunk-group changes with an interconnected party demands a lot of manpower hours, resource time, and money involved in completing a simple report (TGSR) for changing or modifying a particular trunk-group with the interconnected party.

The need exists, therefore, for an improved method that would allow a provider to automate or automatically generate service-request reports for trunk-groups between connected or interconnected trunk groups of one or more carriers. By doing so, a communication carrier will save a vast amount of time, resources, and manpower to perform such a task for each and every switch.

SUMMARY OF THE INVENTION

The present invention is defined by the claims below. In one aspect an embodiment of the present invention provides a computer implemented method for automatically generating Trunk Group Service Requests (TGSR) between one or more group owners. The method includes receiving a switch identifier, receiving an indication of a desired vendor associated with the switch identifier, retrieving one or more records of information related to the desired vendor, populating one or more records of a data structure with the one or more records of information and with one or more trunk-group attributes associated with the trunk groups, providing an input field for receiving additional data to supplement the one or more records of information or the one or more trunk-group attributes, and presenting a report adhering to a pre-defined format using the information of the data structure associated with the one or more trunk groups of the desired vendor.

In another aspect, an embodiment of the present invention provides a computer implemented method for automating a service request notification between one or more entities sharing a communications network. The method includes receiving a switch identifier, wherein the switch identifier is associated with one or more trunk groups, receiving a trunk-group identifier associated with the switch identifier, presenting one or more records of information relating to the switch identifier and the trunk-group identifier, receiving one or more trunk groups from one or more data entry fields, populating a data structure by aggregating the one or more data records of information with the one or more trunk-group attributes, providing an input field for receiving additional data to supplement the one or more records of information or the one or more trunk-group attributes, and presenting a report adhering to a predefined format using the information from the data structure. In a final aspect of the invention, a method of automatically generating a trunk-group service request to expedite communication with one or more recipients. The method includes receiving a switch identifier, receiving a vendor identifier associated with the switch identifier, presenting one or more records of information of one or more trunk groups associated with the switch identifier and the vendor identifier, receiving one or more trunk-group attributes from one or more data entry fields, populating a data structure by aggregating the one or more records of information related to their switch identifier and the vendor identifier with the one or more trunk-group attributes, providing an input field for receiving additional data to supplement the one or more records of information or the one or more trunk-group attributes, and presenting a report adhering to a predefined format using the information of the data structure.

In one embodiment, the present invention offers several practical applications in the technical arts, including automating the developing steps involved with creating a trunk-group service request process. This method of performing an automatic request on a network requires less resources associated with development time, and requires a significant reduction in time and manpower. By automating the request, a communication carrier can simplify the task of extracting information from a switch or switch facility relating to one or more connected or interconnected trunk-group circuits.

BRIEF DESCRIPTION OF THE SEVERAL VIEWS OF THE DRAWING

The present invention is described in detail below with reference to the attached drawing figures, which are expressly incorporated by reference herein, and wherein:

FIG. 5 is a report depicting an exemplary presentation of an external service request of the present invention;

DETAILED DESCRIPTION OF THE INVENTION

Embodiments of the invention provide an improved method for creating trunk-group service requests within a communications network. A communications network is a network that provides, for example, voice, data, and/or media communications. It is a complex task for a provider to inform both internal and external parties of connected and interconnected trunk-group circuits of changes being performed through the use of a trunk-group service-request. By automating the process involved with generating a trunk-group service request, a provider can better serve its clients and customers. As growth in communications networks continues to rise, a tool for generating a trunk-group service request becomes a critical asset.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| ACNA | Access Carrier Name Abbreviation |
| CLEC | Competitive Local Exchange Carrier |
| ELEC | Enterprise Local Exchange Carrier |
| ILEC | Incumbent Local Exchange Carrier |
| LAN | Local Area Network |
| LEC | Local Exchange Carrier |
| PSTN | Public Switched Telephone Network |
| WAN | Wide Area Network |

Further, various technical terms are used throughout this description. A definition of such terms can be found in *Newton's Telecom Dictionary* by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed by the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In one embodiment, the present invention takes the form of a computer-program product that includes computer-useable instructions embodied on a computer-readable medium.

Computer-readable media include both volatile and nonvolatile media, removable and nonremovable media, and contemplates media readable by a database, a switch, and various other network devices. Network switches, routers, and related components are conventional in nature, as are the means of communicating with the same. By way of example, and without limitation, computer-readable media include data-storage media and communications media.

Data-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, Digital Versatile Discs (DVD), holographic media or other optical storage devices, magnetic cassettes, magnetic tape, magnetic disk storage, and other magnetic storage devices. These memory components can store data momentarily, temporarily, and/or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
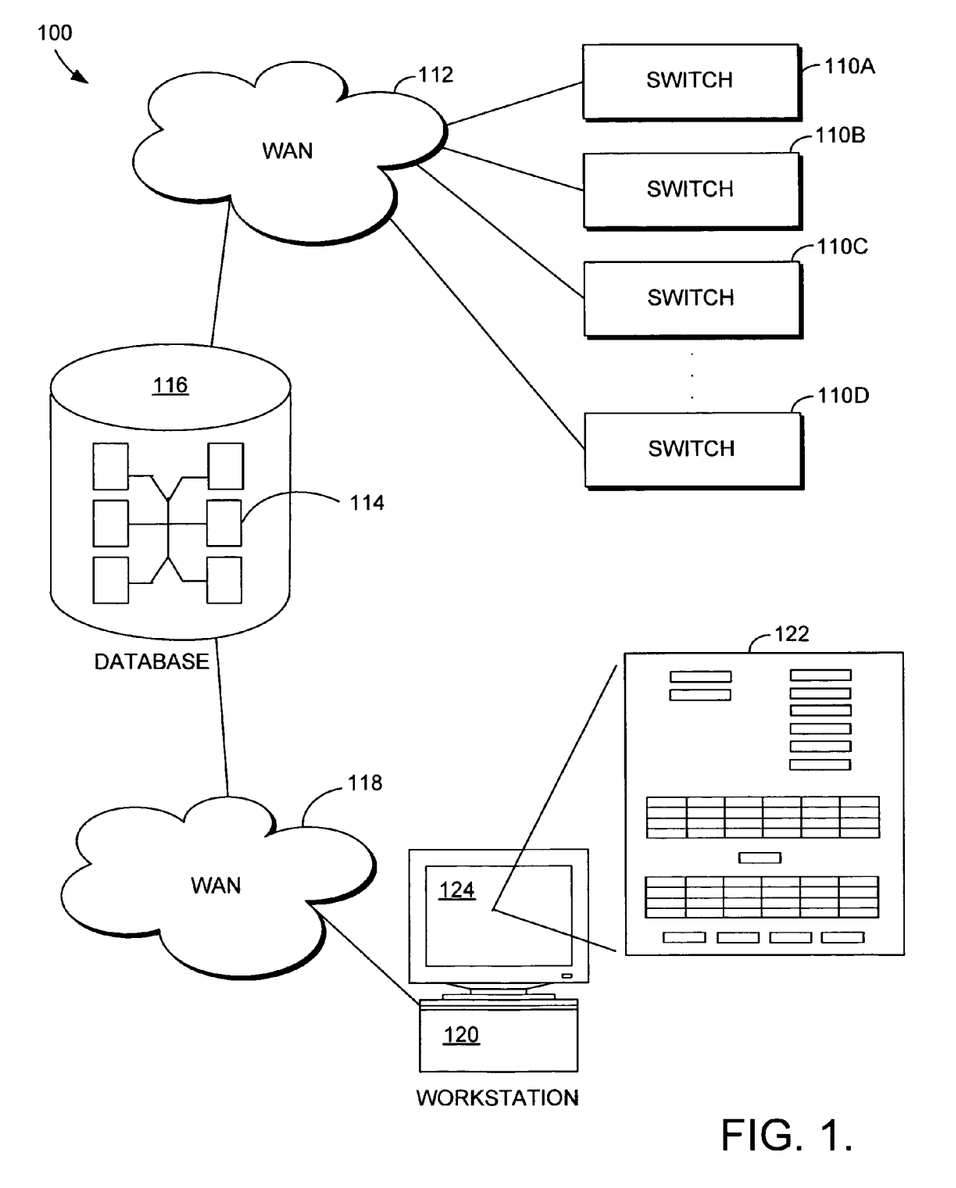
FIG. 1 is a schematic illustration of a communications network comprised of one or more networking resources in accordance with an embodiment of the present invention.

Referring now to FIG. 1, a network diagram 100 is depicted and illustrates an exemplary communications network having workstation 120 communicating over a Wide Area Network (WAN) 118. In addition, Wide Area Network 118 may be a Local Area Network (LAN) or other common networking architecture. Wide Area Network (WAN) 118 is connected to a central database 116, which communicates with one or more switches 110A through 110D.

Network diagram 100 provides a general overview of the present invention. Switch 110 A through 110D represents a communication switch or switch facility that provides data switching, telecommunication switching, or wireless communication switching. Switch or switch facility 110A through 110D may include one or one hundred switches or switching facilities, and the present invention is not limited in scope to the number of switch or switch facilities within the present invention. One skilled in the art understands that a switch or switching facility provides connections or interconnections between one or more parties, one or more trunk groups, or a combination thereof.

A switch is a device or group of complex networking components that provide switching needs for routing and distributing communications between interconnected parties, other internal networks, or a plurality of customers. In addition, a switch may provide a connection to wireless-communication carriers to communicate over a public switched telephone network (PSTN), which provides communication over trunk groups on a wired network. In a telecommunications network, a local exchange carriers (LECs) such as incumbent local exchange carriers (ILECs) and competitive local exchange carriers (CLECs), and enterprise local exchange carriers (ELECs) communicate with other local exchange carriers (ILECs, CLECs, and ELECs) using switching facilities interconnected between one another to communicate customer traffic outside of their local exchange territory. For example, a known long distance carrier, may communicate with the incumbent local exchange carriers (ILECs) network, but will be connected or interconnected at the CLEC's switch. More specifically, a switch provides a common resource for connecting and interconnecting carriers of all types on a communications network.

When one or more trunk groups within a carrier's switch has to be added, deleted, reassigned, or relocated due to changes being made in the carriers network, it is the responsibility of the carrier performing the change at the switch to communicate the change with the interconnected party by sending the changes in the form of a trunk group service request, which may be a report, an email, or a website. In addition, the carrier will include the dates and time when the changes will occur.

In an embodiment, a process is provided for a carrier to more efficiently retrieve one or more records from a group of switches 110A through 110D to assist a provider or carrier by performing trunk-group changes in a cost efficient and expedient manor. To do so, data structure 116 will communicate with a central database that retrieves switch information from the plurality of switches 110A through 110D. Within database 116, one or more relational tables 114 are coupled to provide a centralized structure with the ability to obtain information of each connected and interconnected trunk group. Database 116 may be remotely located from workstation 120 or the one or more switches 110A through 110D utilizing a Wide Area Network 112 or 118. The present invention communicates with data structure 116, and is able to receive and retrieve information from tables 114. The scope of the present invention is not limited to just relational databases, and may be, for example, a non-relational database, a simple spreadsheet, or a combination thereof.

To provide a trunk-group request or report, a provider may open a request tool 122 and view the tool on a display monitor 124, which receives records of information from database 116. This allows the provider to simply fill out information within request tool 122, and initiate a populate button to fill out a table, which allows the table to export the information to a presentable report for printing or viewing. More importantly, an exemplary embodiment of the present invention allows connected and interconnected trunk-group circuits being modified to be viewed and displayed.

Figure 2:
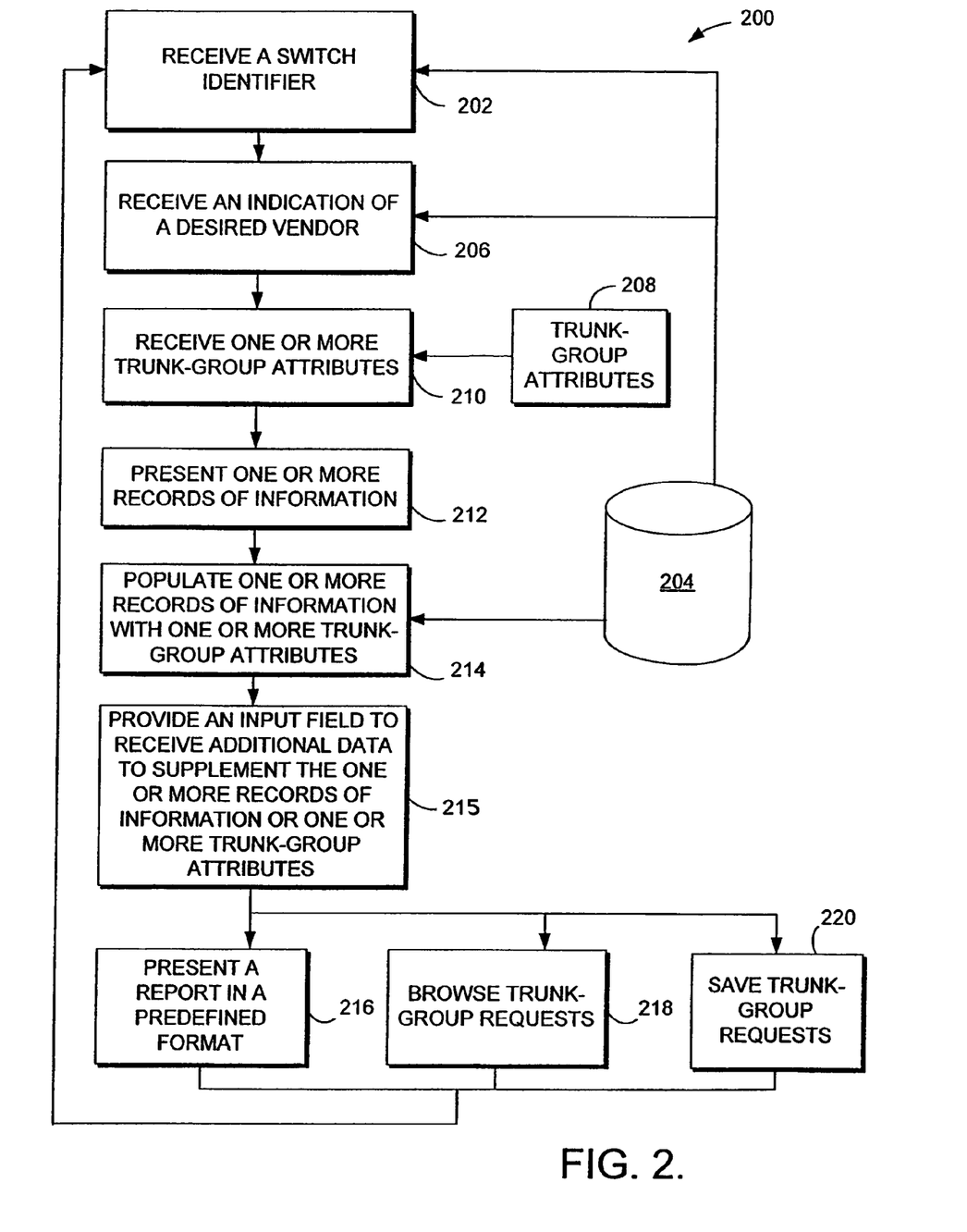
FIG. 2 is a flow diagram depicting an exemplary embodiment of the present invention.

Turning now to FIG. 2, a flow diagram 200 is depicted showing one or more steps of the present invention. To better understand an embodiment of the present invention, each block diagram step provides an approach for obtaining information from one or more switches. In a step 202, the request tool 122 receives a switch identifier. A switch identifier, may be, for example, a name, a number, a code or a combination thereof for a switch or switch facility. A switch identifier is received from data structure 204, and provided within a list box. Request tool 122 receives an indication of a desired vendor as depicted in a step 206, from data structure 204. A selection of an appropriate indication from within a list box may be made.

Figure 4A:
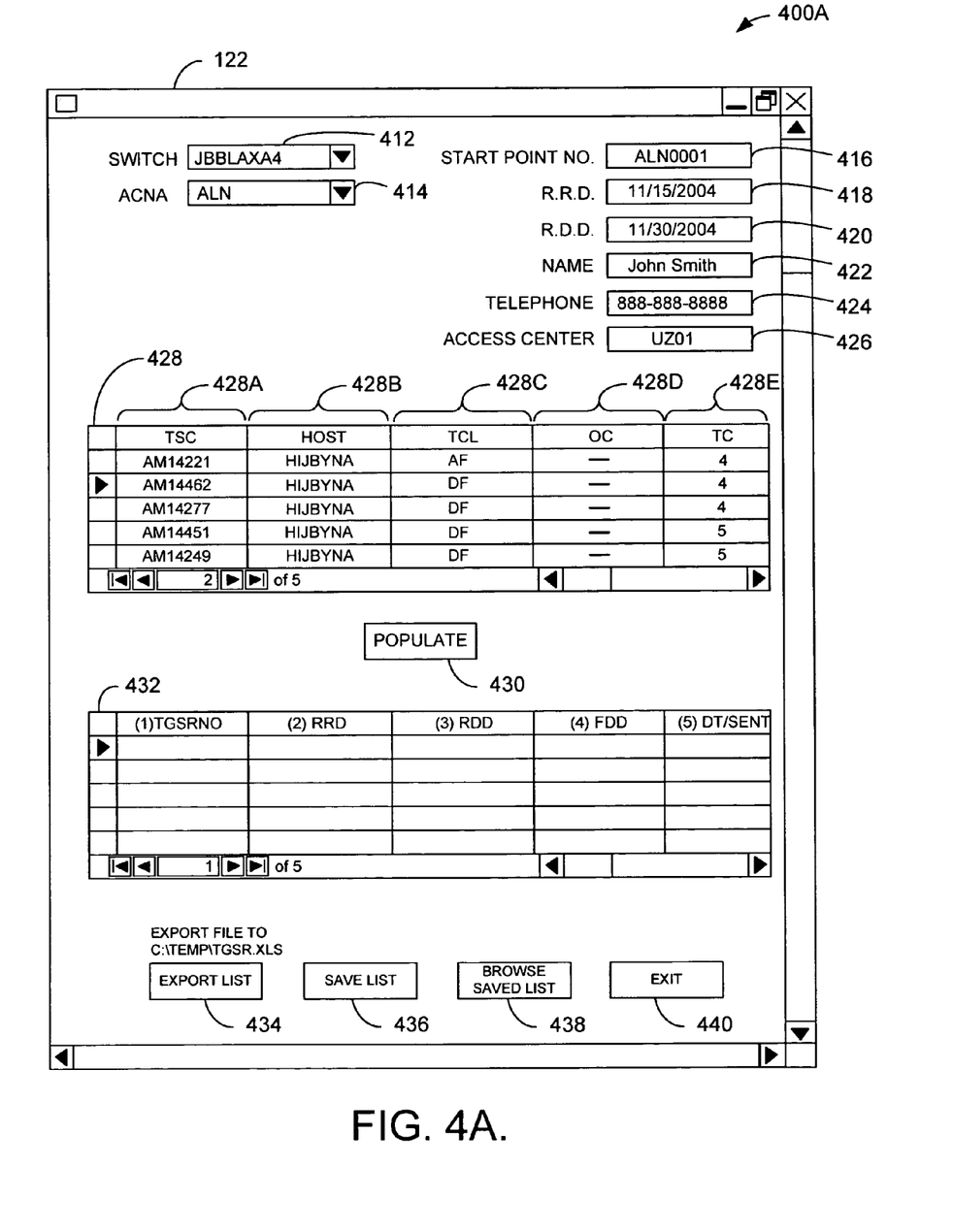
FIG. 4A is a screen-shot view depicting pre-populated records and fields of an exemplary embodiment of the present invention.

An example of both the switch identifier and the indication of a desired vendor can be seen in FIG. 4A. A screenshot view 400A of request tool 122 is shown to illustrate the graphical display the request tool provides in conjunction with FIG. 2 steps. Request tool 122 is a set of computer-executable files that process and present the information described herein. Request tool 122 allows the switch identifier 412 and the desired vendor 414 to be selected from a list box. A list box is used within an embodiment of the present invention, but may be, for example, a text box, a list box, a combination box, an image, or a combination thereof. Data structure 428 is populated with information that is retrieved from data structure 204. This provides request tool 122 with the ability to review the current switch and access carrier information.

In one embodiment of the present invention, entry fields are provided to manually enter fields for supplementing information within a service-request report. Request tool 122 receives one or more trunk-group attributes as shown in a step 210 from the trunk-group attributes 208. Trunk-group attributes 208 are input fields that allow a provider to manually type optional information within the tool to generate a trunk-group service request. In FIG. 4A, one or more trunk-group attributes are shown as a start point number 416, a request response date 418, a request due date 420, a name 422, a telephone number 424, and an access center 426. In one embodiment of the present invention, text boxes are used in 416 through 426. But as person of ordinary skill in the art would appreciate, other input fields such as list box, combination boxes, selectable radio buttons, check boxes, or a combination thereof could be used for receive information. Moreover, the trunk-group attributes 416 through 426 may be different from what is shown, and the scope of the invention is not limited to any particular name, title, function, or the number of attributes being displayed.

Once a switch identifier and an indication of desired vendor is received and selected from a list in 412 and 414, data structure 428 is presented with more or more records of information relating to switch identifier 412 and the indication of a desired vendor 414. The indication of a desired vendor 414 may also be referred to within one embodiment of the present invention as an access carrier name abbreviation (ACNA), but the indication 414 is not limited in scope to any particular name, title, abbreviation, or acronym. Items 428A through 428E represent exemplary information that might be contained in the data structure 428. Field 428A contains Two-Six Codes, or TSC, identifying trunk group reference numbers; Field 428B contains the identifiers of host IDs for a switch; Field 428C contains identifiers of TCL IDs; Field 428D contains identifiers of Optical Circuits, or OC; and 428E contains identifiers of trunk circuits, or TCs. These fields are exemplary of the type of information that would be found in a data structure in accordance with the principles of the present invention.

Upon the selection of a switch identifier 412, desired vendor 414, and insertion of optional trunk-group attributes 416 through 426, a provider may populate the information shown in data structure 428 with the one or more trunk-group attributes 416 through 426 and aggregately combine the information into data structure 432 by pressing populate button 430. This allows the program to populate one or more records of information with one or more trunk-group attributes, as shown in a step 214, by receiving the information from trunk group 204 and the previously selected trunk-group attributes 208.

Figure 4B:
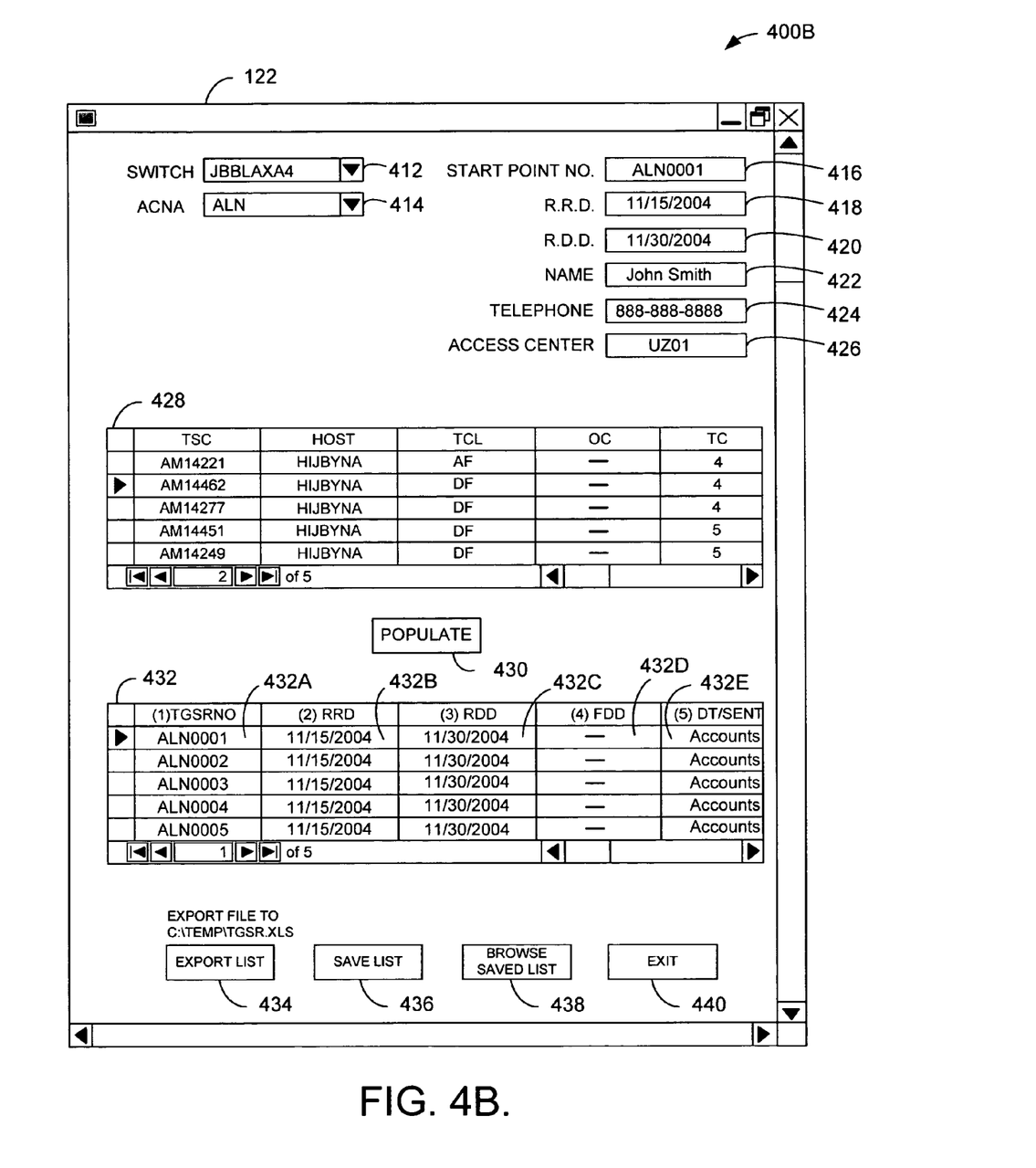
FIG. 4B is a screen-shot view depicting post-populated records and fields of an exemplary embodiment of the present invention.

Once populated, the system provides an input field to receive additional data to supplement the one or more records of information or one or more trunk-group attributes 215 within data structure 432. As can be seen in FIG. 4B, data structure 432 provides a variety of data-entry fields 432A through 432E that allows manual selection and changes to occur with the populated information. In entry field 432A, a record within a field column is shown with start point number 416 displayed within data structure 432. This provides a new trunk-group service request identifiable number for the communications carrier, and allows them to easily identify the trunk group by the new starting point numbers. In entry field 432B, a date is shown that is a request response date 418 for each of the trunk groups being serviced. This provides the trunk-group service request the ability to inform the communications carrier of when a request response date should be provided. In entry field 432C, a request due date is presented which provides the provider with a date to inform the communications carrier when the changes to the trunk-group circuit will be changed and completed. Data structure 432 also provides a plurality of other fields which includes 432D, 432E, 432Z, or further. The populate command 430 allows the system to aggregately combine the switch and desired vendor information with the trunk-group attributes provided in 416 through 426.

In an exemplary embodiment of the present invention, data structure 428 and 432 are spreadsheet tables familiar to one skilled in the art. Data structures 428 and 432, may be, for example, a spreadsheet table, a database table, a document, an image, or a combination thereof.

Referring back now to FIG. 2, request tool 122 may present a report in a predefined format 216, browse a trunk-group request 218, or save a trunk-group request in a data structure 220. In FIGS. 4A and 4B, a group of buttons 434 through 440 are shown to allow request tool 122 to provide buttons for performing additional tasks. A "browse saved list" button 438 may be selected to browse any previously stored historical records of service requests that may have been stored on the network system. In a step 216, request tool 122 presents a report in a predefined format. This may be represented by selecting export list button 434 that exports the populated data structure 432 to a file located on a workstations hard drive, a computer readable media, or temporary memory. In one embodiment, "export list" button 434 exports the file to a spreadsheet file, but the scope of the invention is not limited to any particular report format, and may be, for example, a word-processing document, a database, a table, an image, or a combination thereof. Moreover, a "save trunk group" request, as shown in a step 220, may be initiated by selecting button 436 to save data structure 432 to a database, spreadsheet, or document.

Export list button 434 allows request tool 122 to export data structure 432 in a report predefined by the program. The report may be a document, a table, an image, an electronic slide presentation, or a combination thereof. In one embodiment of the present invention, a trunk-group service-request report is shown in FIG. 5. Report 500 is presented as a trunk-group service request for an external communications party.

As an illustrative embodiment of the present invention, trunk-group service request 510 provides information within an administrative section, a trunk-group detailed section, a contacts-detail section, and a remarks section. The administrative section presents information to administer and possibly reroute, modify, or add a new trunk group at a specific switch facility. The trunk-group detail section provides additional information used to understand the trunk-group details of the interconnected circuit. In addition, a contact-detail section, provides contact information at the switch facility for contacting a specific individual or party requesting the modification of the trunk-group circuit. Last, a remarks section is provided to inform a recipient of information specific to a connected or interconnected trunk group that will assist the external communication party to fulfill the requirements used to make the change or modification on the circuit.

Figure 6A:
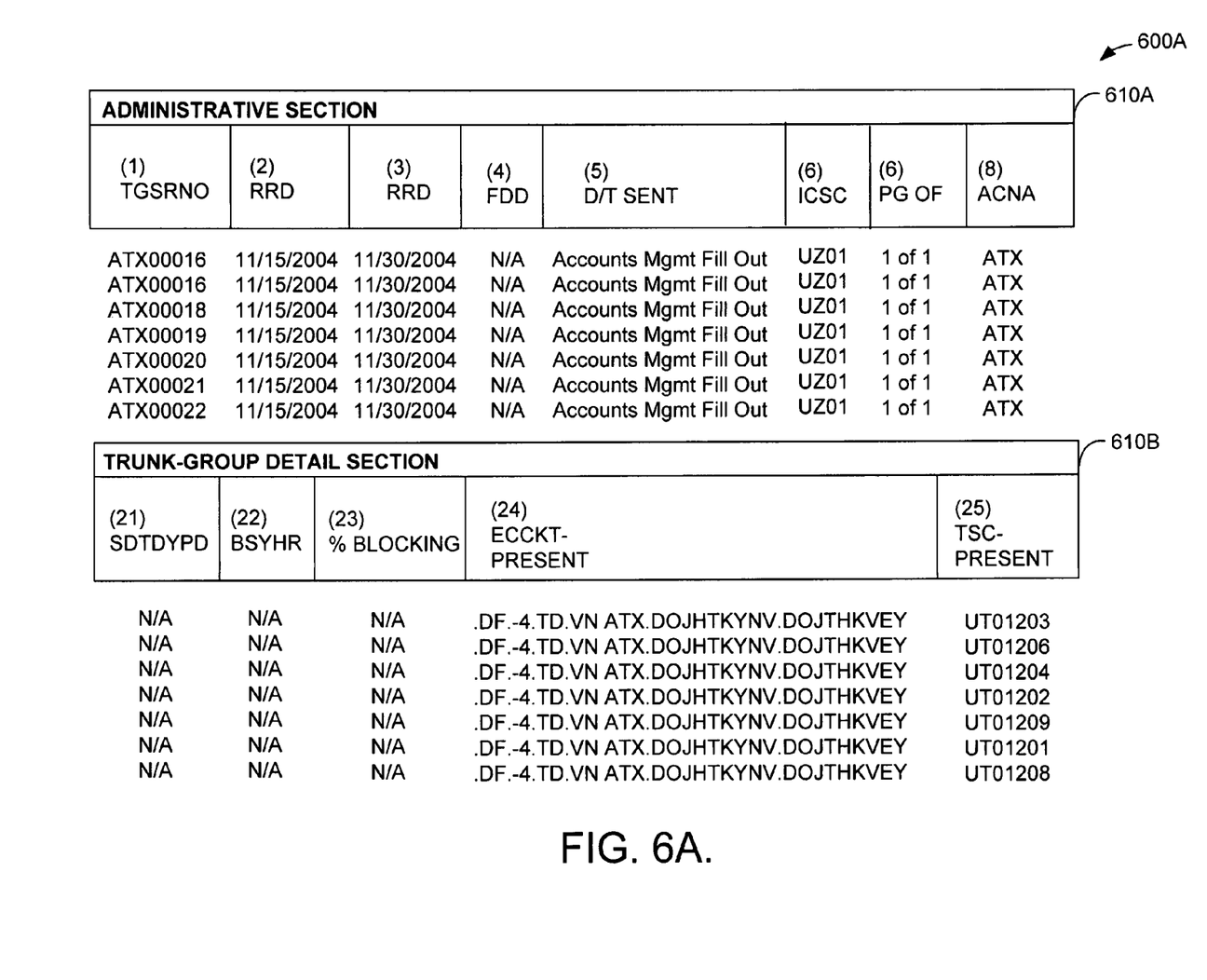
FIG. 6A is a report depicting an exemplary presentation of an internal service request of the present invention.
Figure 6B:
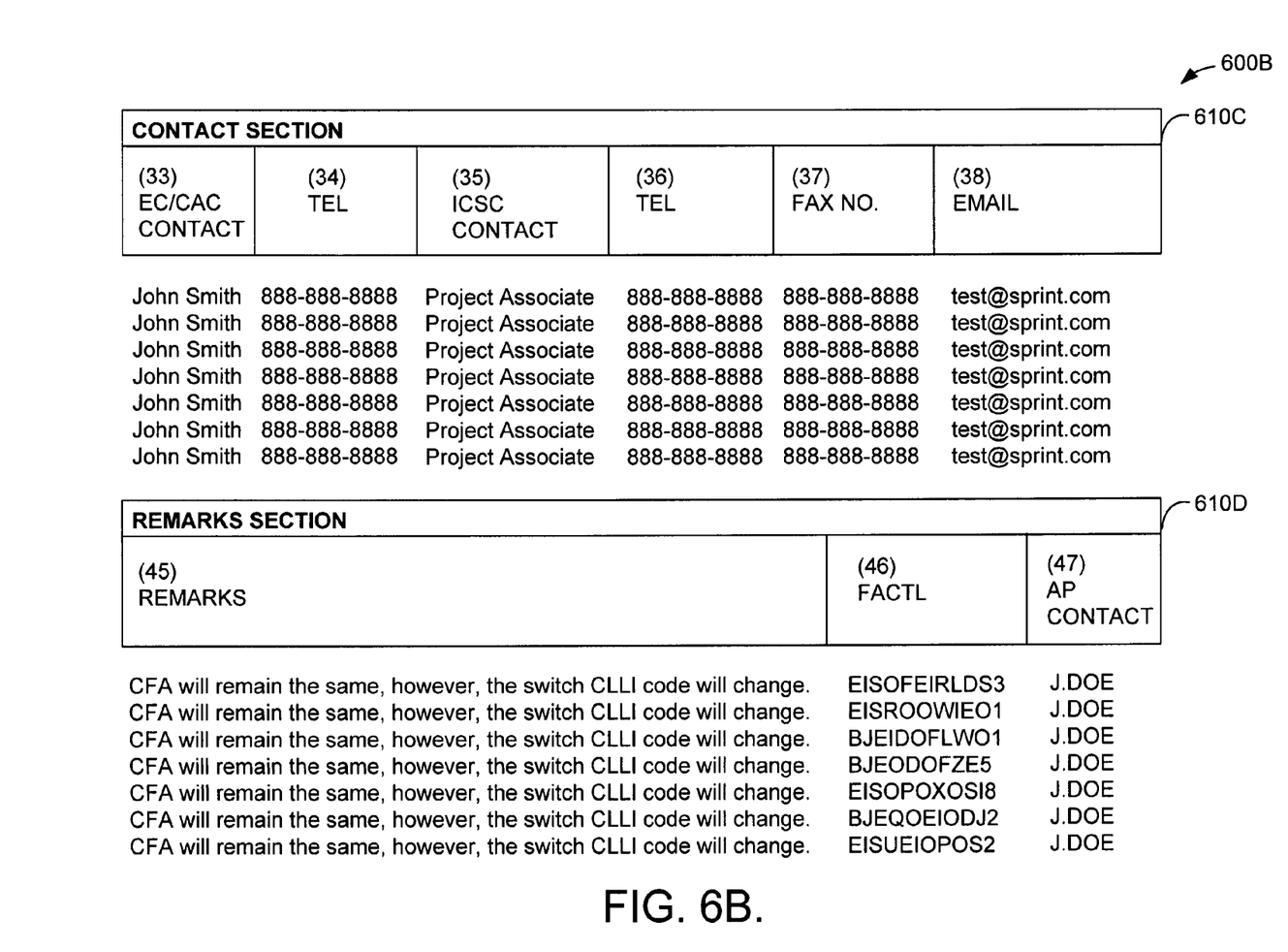
FIG. 6B is a continuation of the FIG. 6A report depicting an exemplary presentation of an internal service request of the present invention.

Referring now to FIGS. 6A and 6B, internal service-request reports 600A and 600B depict illustrative reports for the provider's internal service-request needs for informational purposes. In one embodiment, the internal report 600A and 600B is provided in a data-structure format having a set of fields and various sections as previously mentioned. An administrative section 610A is shown having fields and information for the internal requesting party's specific needs. A "trunk-group detail" section 610B provides the internal requesting party with a plurality of fields pertaining to the circuit and desired by the internal requesting party. A "contact section" 610C provides a plurality of fields pertaining to contact information of the internal party presenting the trunk-group service request. Lastly, a "remarks" section 610D is shown with remarks made by a requester administering the service request to inform information pertinent to a trunk group.

Figure 3:
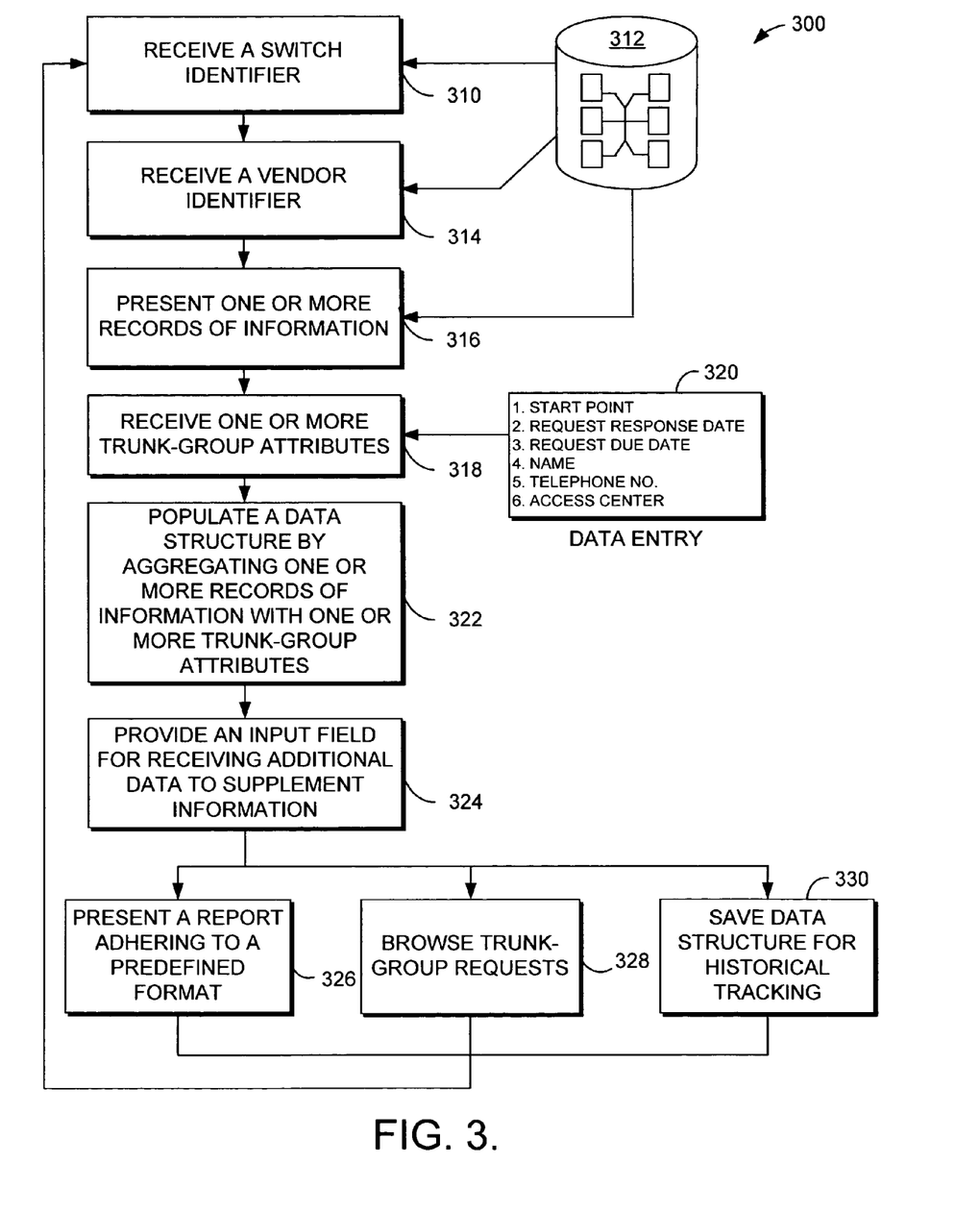
FIG. 3 is a flow diagram depicting more detailed functional steps offered by an exemplary embodiment of the present invention.

Referring now to FIG. 3, a flow diagram of the system 300 is shown in a more detailed view of steps of the present invention. Request tool 122 receives a switch identifier 310 as shown in list box 412 located in FIG. 4A. During this step, information is received from data structure 312 having a plurality of tables, which may be relational database tables that provide the request tool 122 with access carrier names as shown in list box 414. Within this step, request tool 122 receives a vendor identifier 314 which is labeled as an ACNA, or access carrier name abbreviation, as shown in 414. After the selection of both a switch identifier 412 and a vendor identifier 414, request tool 122 presents one or more records of information 316 in a data structure 428.

Request tool 122 receives one or more trunk-group attributes as shown in a step 318, from data entry fields 320, which may be a start point number 416, request response date 418, a request due date 420, a name 422, a telephone number 424, or an access center 426. In one embodiment of the present invention, data entry fields 416 through 426 are text boxes, but may be a list box, a radio button, a checkbox, a combination box, or a combination thereof. Once a switch identifier and vendor identifier are received, as previously mentioned, data structure 428 is populated with information pertaining to the current selected circuit.

Populate button 430 may be initiated to populate a data structure by aggregating one or more records of information within data structure 428 with one or more trunk-group attributes 416 through 426, as shown in a step 322. During this step, both data structure 428 information and data-entry fields 416 through 426 are aggregated together and displayed in data structure 432. Data structure 428 and data structure 432 may be a database table, a spreadsheet, a document, or an image. Further, request tool 122 provides an input field for receiving additional data to supplement the information 324 in data structure 432. This allows a record to be selected in data structure 432 to add, modify, or change information within a record.

Now, request tool 122 presents a report adhering to a predefined format 326, browse a trunk-group request 328, or save the data structure for historical tracking 330. This is represented in FIGS. 4A and 4B as an "export list" button 434, a "save list" button 436, and a "browse save list" button 438. "Export list" button 434 provides the tool a step to present a report adhering to a specific format which, in one embodiment of the present invention, is a spreadsheet. However, "export list" button 434 may also export information from data structure 432 into a text document, a database table, a spreadsheet, an image, or a combination thereof. A "save list" button 436 allows request tool 122 to save the data structure to a database, a local hard drive, remote storage device, or other means of saving information in a known media format. A "browse save list" button 438 provides a step to browse previously saved service requests made on trunk-group circuits that were formerly added, deleted, or modified to the system. Lastly, an "exit" button 440 is provided for exiting the program.

When the "export list" button 434 is selected, two different trunk-group service requests may be generated. Referring now to FIG. 5, a report 500 is depicts an external trunk-group service request for an external party or provider. Report 500 is provided with various information sections 510 which comprises an administrative section, a "trunk-group detail" section, a "contacts detail" section, and a "remarks" section. Report 500 may then be presented and/or printed for presenting to the external party.

In addition, an internal trunk-group service request is shown in FIGS. 6A and 6B. The internal report 600A and 600B provides the requesting tool 122 a way of reviewing an administrative section 610A having a plurality of fields and trunk-group information. Moreover, trunk-group detail section 610B is provided with information relating to a certain trunk-group circuit. A "contacts detail" section 610C provides contact information relating to each trunk-group circuit being added, modified or deleted. A "remarks" section communicates various remarks used to add, delete, or modify a circuit.

This disclosure sets forth illustrative examples of a method for automating or automatically generating a service request on a communications network with an automatic method of receiving, retrieving, populating, aggregating, providing, and presenting information of one or more trunk-group circuit requests in a report. The present invention is not limited to any particular type of communication resource or network, nor is it limited to any given system or tool or protocol of any type. Many aspects of the present invention may be implemented using computer software embodied on a computer readable media to be executed by computer or other machine. The use of such computer software may be particularly useful as part of a communications network tool. The present invention is not limited to the use of any particular programming language, nor is it limited to the use of any particular computer or other machine to execute the machine readable code. This and other variations of the invention will be apparent to one of ordinary skill in the art.

Certain features and subcombinations are of utility and may be employed without reference to other features and subcombinations and are contemplated within the scope of the claims. The steps listed in this specification and the various figures do not need to be carried out in the order illustratively recited.

What is claimed is:

1. A method for automatically generating service requests associated with trunk groups between one or more owners, the method comprising:
    receiving a switch identifier,
    receiving an indication of a desired vendor associated with said switch identifier;
    retrieving one or more records of information related to said desired vendor;
    populating one or more records of a data structure with said one or more records of information and with one or more trunk-group attributes associated with said trunk groups;
    providing an input field for receiving additional data to supplement said one or more records of information or said one or more trunk-group attributes; and
    presenting a report adhering to a predefined format using the information of said data structure associated with said one or more trunk groups of said desired vendor.

2. The method of claim 1, wherein said one or more owners includes a selection from the following: a telecommunications carrier, a data-packet carrier, a wireless-communications carrier, or a combination thereof.

3. The method of claim 2, wherein said switch identifier includes one or more of the following: a number, a name, a code, or a combination thereof.

4. The method of claim 1, wherein retrieving one or more records of information further comprises:
    receiving said information from a database;
    populating said information within one or more records of a table; and
    presenting said table on a display device.

5. The method of claim 4, wherein said one or more records of information includes at least one selection from the group comprising: an administrative section, a trunk-group detail section, a contact-information section, a remarks section, or a combination thereof.

6. The method of claim 5, wherein said report includes at least one selection from the group comprising: a document, a table, an image, an electronic slide presentation, or a combination thereof.

7. A method for automating a service-request notification between one or more entities sharing a communications network, the method comprising:
    receiving a switch identifier, wherein said switch identifier is associated with one or more trunk groups;
    receiving a trunk-group identifier associated with said switch identifier;
    presenting one or more records of information relating to said switch identifier and said trunk-group identifier;
    receiving one or more trunk-group attributes from one or more data-entry fields;
    populating a data structure by aggregating said one or more data records of information with said one or more trunk-group attributes;
    providing an input field for receiving additional data to supplement said one or more records of information or said one or more trunk-group attributes; and
    presenting a report adhering to a predefined format using the information from said data structure.

8. The method of claim 7, wherein said switch identifier includes a name, number, or combination thereof for at least one of the following: a telecommunications switch, a data switch, a communications-connection facility, or a combination thereof.

9. The method of claim 8, wherein said one or more trunk groups are identifiable communication interconnections with other competitive or local exchange carriers, wireless communications carriers, data-communications carriers, or a combination thereof.

10. The method of claim 9, wherein said trunk-group identifier is an interconnected trunk group within said communications network.

11. The method of claim 10, wherein said one or more records of information includes at least one selection from the following: an administrative section, a trunk-group detail section, a contact-information section, a remarks section, or a combination thereof.

12. The method of claim 7, wherein providing an input field for receiving additional data to supplement said one or more records of information or said one or more trunk-group attributes, further comprises:
- adding data records to said data structure;
- inputting information into said data structure; and
- modifying one or more fields or records in said data structure.

13. The method of claim 12, wherein said report includes at least on of the following: a document, a table, an image, an electronically displayed image, or a combination thereof.

14. A method of automatically generating a trunk-group service request to expedite communication with one or more recipients, the method comprising:
- receiving a switch identifier,
- receiving a vendor identifier associated with said switch identifier;
- presenting one or more records of information of one or more trunk groups associated with said switch identifier and said vendor identifier;
- receiving one or more trunk-group attributes from one or more data-entry fields;
- populating a data structure by aggregating said one or more records of information related to said switch identifier and said vendor identifier with said one or more trunk-group attributes;
- providing an input field for receiving additional data to supplement said one or more records of information or said one or more trunk-group attributes; and
- presenting a report adhering to a predefined format using the information of said data structure.

15. The method of claim 14, wherein said switch identifier includes a name, number, or combination thereof for at least one of the following: a telecommunications switch, a data switch, a communications-connection facility, or a combination thereof.

16. The method of claim 15, wherein said vendor identifier is an interconnected trunk-group party.

17. The method of claim 14, wherein presenting said one or more records of information further comprises:
- receiving said information from a database;
- populating said information within one or more records of a table; and
- presenting said table on a display device.

18. The method of claim 17, wherein said one or more records of information includes at least one selection from the following: an administrative section, a trunk-group detail section, a contact-information section, a remarks section, or a combination thereof.

19. The method of claim 18, wherein said one or more trunk groups are identifiable communication interconnections with other competitive or local-exchange carriers, wireless-communications carriers, data-communications carriers, or a combination thereof.

20. The method of claim 19, wherein said data structure includes at least one of the following: a database, a spreadsheet, or a document.

21. The method of claim 14, wherein providing an input field for receiving additional data to supplement said one or more records of information or said one or more trunk-group attributes, further comprises:
- adding data records to said data structure;
- inputting information into said data structure; and
- modifying one or more fields or records in said data structure.

22. The method of claim 21, wherein said report includes at least one selection form the group comprising: a document, a table, an image, an electronically displayed image, or a combination thereof.

* * * * *